(12) United States Patent
Kimura et al.

(10) Patent No.: US 12,669,657 B2
(45) Date of Patent: Jun. 30, 2026

(54) OPTICAL CONNECTOR FERRULE, OPTICAL CONNECTOR, AND PRODUCTION METHOD FOR OPTICAL CONNECTOR

(71) Applicants:NIPPON TSUSHIN DENZAI CO., LTD., Komaki (JP); SUMITOMO ELECTRIC INDUSTRIES, LTD., Osaka (JP)

(72) Inventors: Motoyoshi Kimura, Komaki (JP); Masaki Omura, Osaka (JP)

(73) Assignees: NIPPON TSUSHIN DENZAI CO., LTD., Komaki (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 282 days.

(21) Appl. No.: 18/291,628

(22) PCT Filed: Jul. 20, 2022

(86) PCT No.: PCT/JP2022/028191
§ 371 (c)(1),
(2) Date: Jan. 24, 2024

(87) PCT Pub. No.: WO2023/013415
PCT Pub. Date: Feb. 9, 2023

(65) Prior Publication Data
US 2024/0345334 A1 Oct. 17, 2024

(30) Foreign Application Priority Data
Aug. 5, 2021 (JP) ................................. 2021-128839

(51) Int. Cl.
*G02B 6/40* (2006.01)
*G02B 6/38* (2006.01)

(52) U.S. Cl.
CPC ........... *G02B 6/403* (2013.01); *G02B 6/3839* (2013.01); *G02B 6/3861* (2013.01); *G02B 6/3882* (2013.01)

(58) Field of Classification Search
CPC .............................. G02B 6/3839; G02B 6/403
See application file for complete search history.

(56) References Cited

U.S. PATENT DOCUMENTS

2007/0297726 A1 12/2007 Childers et al.

FOREIGN PATENT DOCUMENTS

JP H09-203827 A 8/1997
JP 2002-328264 A 11/2002
(Continued)

OTHER PUBLICATIONS

Translation of JP-2011048157-A (Year: 2011).*

*Primary Examiner* — Chad H Smith
(74) *Attorney, Agent, or Firm* — Oliff PLC

(57) ABSTRACT

In an optical connector ferrule, a side surface of the front end portion is connected to a front end surface of the front end portion and extends in a direction intersecting the front end surface. The flange portion is connected to the front end portion on an opposite side of the front end surface. The flange portion protrudes from the front end portion in a direction along the front end surface. An optical fiber hole opens in the front end surface and extends in an intersecting direction intersecting the front end surface. The window opens in the side surface. A shortest distance between a connection position where the flange portion and the front end portion are connected to each other and a portion which is closest to the front end surface in the edge is less than or equal to a width of the flange portion in the intersecting direction.

14 Claims, 12 Drawing Sheets

(56)     References Cited

FOREIGN PATENT DOCUMENTS

| | | | |
|---|---|---|---|
| JP | 2003-200461 | A | 7/2003 |
| JP | 2004-004333 | A | 1/2004 |
| JP | 2011048157 | A * | 3/2011 |

* cited by examiner

OPTICAL CONNECTOR FERRULE, OPTICAL CONNECTOR, AND PRODUCTION METHOD FOR OPTICAL CONNECTOR

TECHNICAL FIELD

The present disclosure relates to an optical connector ferrule, an optical connector, and a production method for an optical connector. The present application claims priority based on Japanese Patent Application No. 2021-128839 filed on Aug. 5, 2021, the entire contents of which are incorporated herein by reference.

BACKGROUND ART

Patent Literature 1 discloses an optical connector ferrule. The optical connector ferrule includes a front end surface and a side surface connected to the front end surface. The side surface extends in a direction intersecting the front end surface. An optical fiber hole and a window are formed in the optical connector ferrule. The optical fiber hole opens at the front end surface. The window is open at the side surface.

CITATION LIST

Patent Literature

Patent Literature 1: Japanese Unexamined Patent Publication No. 2003-200461

SUMMARY OF INVENTION

An optical connector ferrule according to the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and a portion which is closest to the front end surface in the edge is less than or equal to a width of the flange portion in the intersecting direction.

An optical connector ferrule according to the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and the window is 0 mm or more and less than 1 mm.

An optical connector ferrule according to the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and a portion which is closest to the front end surface in the edge is less than or equal to $2/5$ of a shortest distance between the connection position and the front end surface.

An optical connector according to the present disclosure includes any of the optical connector ferrules described above, an optical fiber, and a resin portion. The optical fiber is inserted into the optical fiber hole. The resin portion is exposed from the window and fixes the optical fiber to the optical connector ferrule.

A production method for an optical connector according to the present disclosure uses any of the optical connector ferrules described above. This production method includes inserting an optical fiber into the optical fiber hole, filling a resin from the window, and fixing the optical fiber to the optical connector ferrule by curing the resin filled from the window.

DESCRIPTION OF EMBODIMENTS

Figure 1:
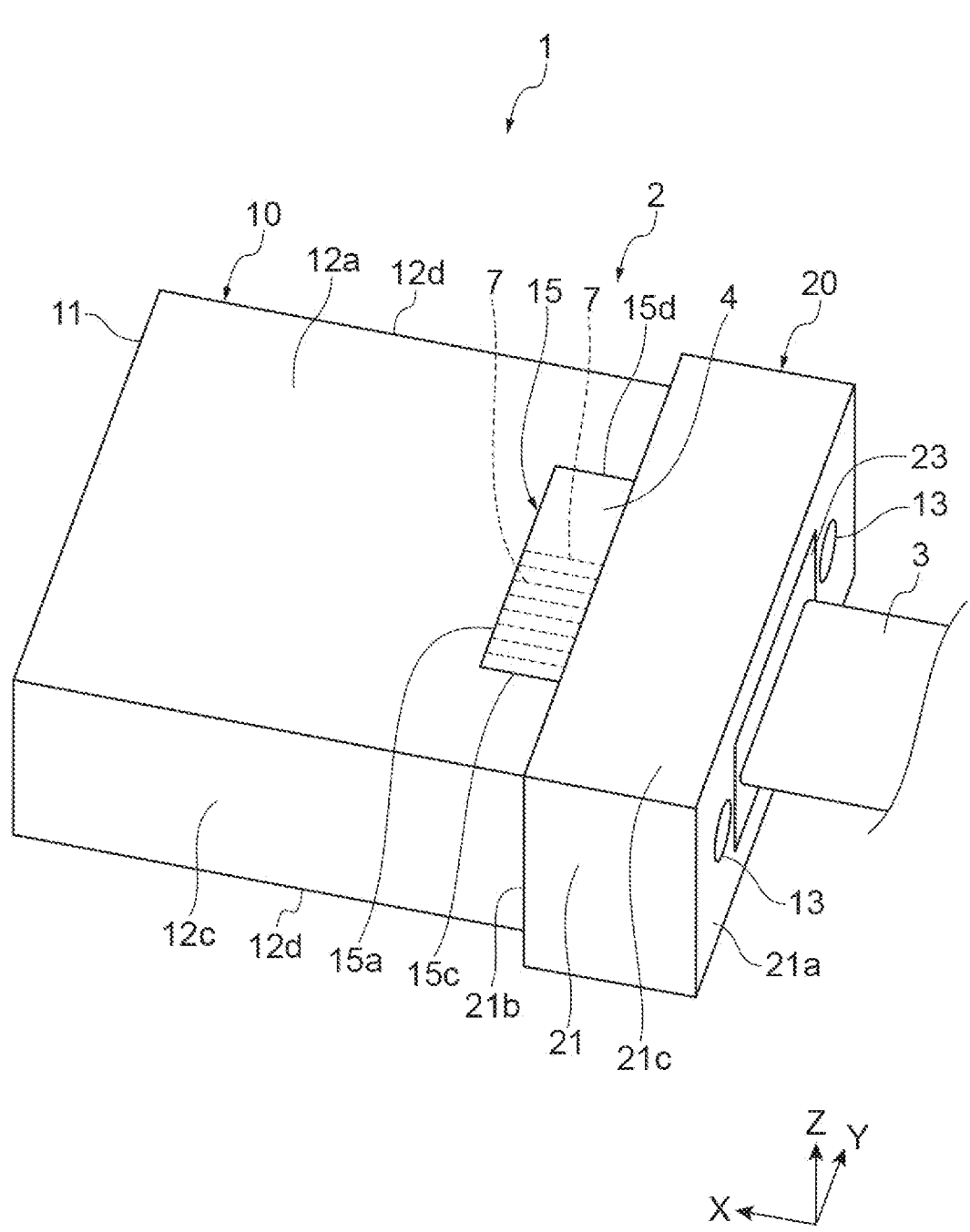
FIG. 1 is a perspective view illustrating an optical connector according to an embodiment.

Problems to be Solved by Present Disclosure

The optical connector ferrule described in Patent Literature 1 is filled with resin from the window in a state where an optical fiber is inserted into the optical fiber hole. By curing the filled resin, the optical fiber inserted into the optical fiber hole is fixed to the optical connector ferrule. However, the filled resin shrinks upon curing. For this reason, the optical connector ferrule may be deformed according to the shrinkage of the resin, and the position of the optical fiber on the front end surface may be displaced. Moreover, residual stress generated during formation of the optical connector ferrule can be mitigated by heat during curing of the filled resin. Also in this case, the optical connector ferrule may be deformed, and the position of the optical fiber on the front end surface may be displaced.

Advantageous Effects of Invention

According to the present disclosure, it is possible to provide an optical connector ferrule in which deformation is suppressed, an optical connector in which deformation of the optical connector ferrule is reduced, and a production method for an optical connector in which deformation of the optical connector ferrule can be suppressed.

DESCRIPTION OF EMBODIMENTS OF PRESENT DISCLOSURE

First, embodiments of the present disclosure will be listed and described.

An optical connector ferrule according to an embodiment of the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and a portion which is closest to the front end surface in the edge is less than or equal to a width of the flange portion in the intersecting direction.

An optical connector ferrule according to an embodiment of the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and the window is 0 mm or more and less than 1 mm.

An optical connector ferrule according to an embodiment of the present disclosure includes a front end portion and a flange portion. The front end portion includes a front end surface and a side surface. The side surface is connected to the front end surface and extends in a direction intersecting the front end surface. The flange portion is connected to the front end portion on an opposite side of the front end surface. The flange portion protrudes from the front end portion in a direction along the front end surface. The front end portion includes at least one optical fiber hole, a window, and an internal space. The at least one optical fiber hole opens in the front end surface and extends in an intersecting direction intersecting the front end surface. The window opens in the side surface. The internal space communicates with the at least one optical fiber hole and the window. The front end portion includes an edge defining a window. A shortest distance between a connection position where the flange portion and the front end portion are connected to each other and a portion which is closest to the front end surface in the edge is less than or equal to $2/5$ of a shortest distance between the connection position and the front end surface.

In the configuration of these optical connector ferrules, the front end surface and the window are relatively separated. As a result of intensive studies, the inventors of the present application have found that deformation of the optical connector ferrule hardly occurs according to such a configuration. When the front end surface and the window are relatively separated from each other, the influence of the shrinkage of the resin hardly occurs on the front end surface even in a case where the resin filled in the internal space from the window is cured. Moreover, in the configuration of the ferrule, the window and the flange portion are relatively close. Since the flange portion protrudes from the front end portion in the direction along the front end surface, the flange portion has higher rigidity than the front end portion. Accordingly, as the window is closer to the flange portion, shrinkage of the resin near the window and heat at the time of curing the resin hardly affect deformation of the ferrule. Therefore, deformation of the ferrule is suppressed.

As an embodiment of the optical connector ferrule, a guide hole into which a guide pin for fixing the optical connector ferrule to another optical connector ferrule is inserted may be formed in the front end portion. The guide hole may be open in the front end surface and extend in an intersecting direction intersecting the front end surface. In this case, if deformation of the optical connector ferrule is suppressed on the front end surface, displacement between the guide hole and the optical fiber hole is also suppressed. As a result, reliability of optical coupling with another optical connector ferrule can be improved.

As an embodiment of the optical connector ferrule, the window may be defined by an edge included in the front end portion and a flange portion. In this case, the shortest distance between the window and the flange portion is 0 mm. Therefore, the window is close to the flange portion, and deformation of the optical connector ferrule is further suppressed.

As an embodiment of the optical connector ferrule, the front end portion may include a groove in which the optical fiber is disposed at a position overlapping the window when viewed in an orthogonal direction orthogonal to the side surface on which the window is formed. The optical fiber is inserted into the optical fiber hole. In this case, the position of the optical fiber can be confirmed in the filling of the resin. The confirmation of the position of the optical fiber in the filling of the resin and the deformation of the optical connector ferrule can be compatible.

As an embodiment of the optical connector ferrule, a plurality of the optical fiber holes, which are disposed in an orthogonal direction orthogonal to the side surface on which the window is formed, may be opened on the front end surface. The front end portion may include a plurality of step portions. The plurality of step portions may be disposed in steps at positions overlapping the window when viewed in the orthogonal direction, and a groove may be formed in each of the step portions. Each of the plurality of optical fiber holes disposed in the orthogonal direction may be located on an extension line from the groove formed in each of the step portions different from each other. In this case, even in the optical connector ferrule having a relatively large number of optical fiber holes, the position of the optical fiber can be confirmed in the filling of the resin. The confirmation of the position of the optical fiber in the filling of the resin and the deformation of the optical connector ferrule can be compatible.

An optical connector according to the present disclosure includes the optical connector ferrule according to any one of the forms described above, an optical fiber, and a resin portion. The optical fiber is inserted into the optical fiber hole. The resin portion is exposed from the window and fixes the optical fiber to the optical connector ferrule. In this case, deformation of the optical connector ferrule is suppressed in formation of the resin portion. Therefore, an optical connector in which deformation of the optical connector ferrule is reduced can be provided.

A production method for an optical connector according to the present disclosure uses any of the optical connector ferrules described above. This production method includes inserting an optical fiber into the optical fiber hole, filling a resin from the window, and fixing the optical fiber to the optical connector ferrule by curing the resin filled from the window. In this case, the front end surface is less likely to be deformed when the resin is filled. Therefore, deformation of the optical connector ferrule is reduced.

Details of Embodiments of Present Disclosure

Specific examples of an optical connector ferrule, an optical connector, and a production method for an optical connector according to an embodiment of the present disclosure will be described below with reference to the drawings. Note that the present disclosure is not limited to these examples, but is indicated by the claims, and is intended to include all modifications within the meaning and scope equivalent to the claims. In the description of the drawings, the same elements are denoted by the same reference signs, and redundant description will be omitted.

Figure 2:
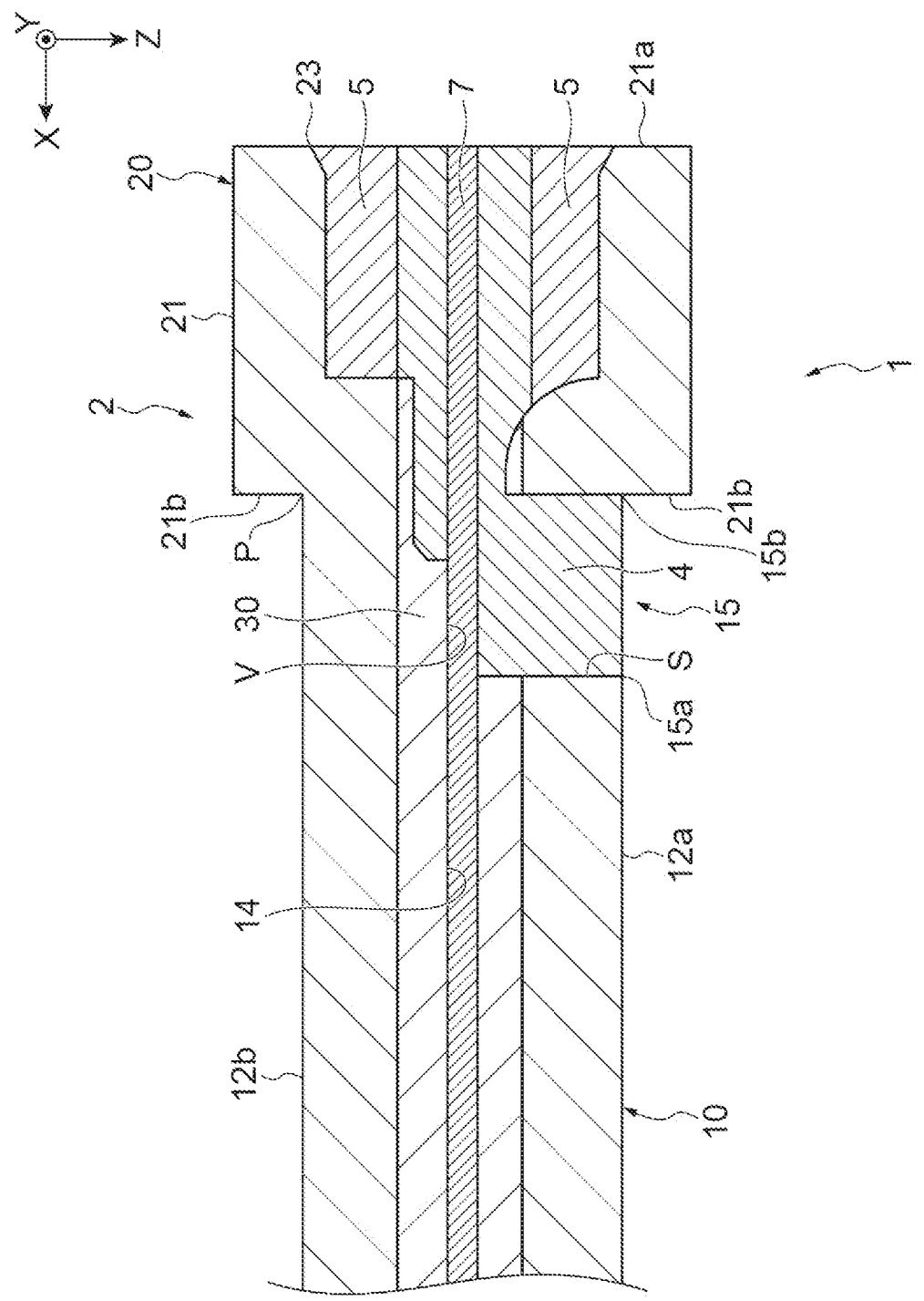
FIG. 2 is a partial cross-sectional view of the optical connector.

First, an example of an overall configuration of an optical connector according to the present embodiment will be described with reference to FIGS. 1 to 7. FIG. 1 is a perspective view illustrating an example of an optical connector according to the present embodiment. FIG. 2 is a partial cross-sectional view of the optical connector. In the following description, for convenience of description, a longitudinal direction of the optical connector is an X direction, a lateral direction of the optical connector is a Y direction, and a height direction of the optical connector is a Z direction. The X direction, the Y direction, and the Z direction intersect each other. In the present embodiment, the X direction, the Y direction, and the Z direction are orthogonal to each other. The same directions may be used to describe the drawings other than FIG. 1.

As illustrated in FIGS. 1 and 2, an optical connector 1 includes an optical connector ferrule 2, an optical fiber ribbon 3, a resin portion 4, and a rubber portion 5. Hereinafter, the optical connector ferrule 2 is simply referred to as a "ferrule 2".

The optical fiber ribbon 3 is a cable that transmits an optical signal. The optical connector 1 includes, for example, at least one optical fiber ribbon 3. In the present embodiment, the optical connector 1 includes, for example, one optical fiber ribbon 3. Each optical fiber ribbon 3 includes a plurality of optical fibers 7. The ferrule 2 holds end portions of the plurality of optical fibers 7.

In the present embodiment, each optical fiber ribbon 3 includes, for example, 16 optical fibers 7. The number of the optical fibers 7 included in the optical connector 1 is not limited thereto. The optical fibers 7 extend in the X-axis direction and are disposed in a row in the Y-axis direction. Each of the optical fibers 7 may be a glass fiber including a core and a cladding surrounding the core. The plurality of optical fibers 7 are collectively coated with a resin. The coating resin may be, for example, an ultraviolet curable resin.

The resin portion 4 is filled in the ferrule 2. The resin portion 4 is, for example, an adhesive. An internal space S is filled with the resin portion 4, and a gap between the optical fiber 7 and the optical fiber hole 14 is also filled with the resin portion 4. By curing the resin portion 4, the optical fiber ribbon 3 and the plurality of optical fibers 7 are fixed to the ferrule 2. The resin portion 4 is, for example, a curable adhesive containing an epoxy resin, and is cured by light or heat. The optical connector 1 is used, for example, to optically connect the plurality of optical fibers 7 to a plurality of optical fibers accommodated in another optical connector. The rubber portion 5 is disposed in the ferrule 2. The resin portion 4 and the rubber portion 5 are exposed from the ferrule 2.

Figure 3:
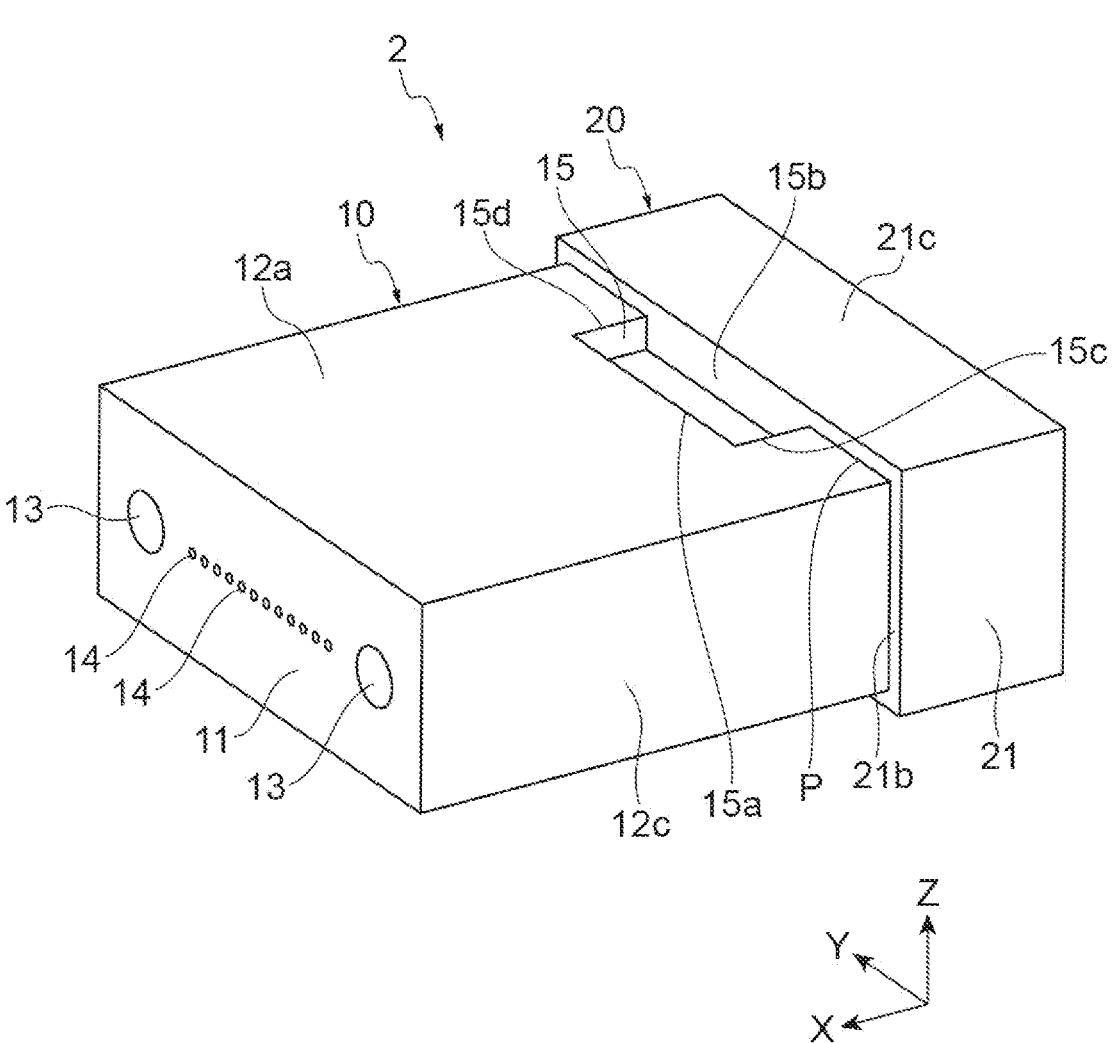
FIG. 3 is a perspective view of an optical connector ferrule.
Figure 4:
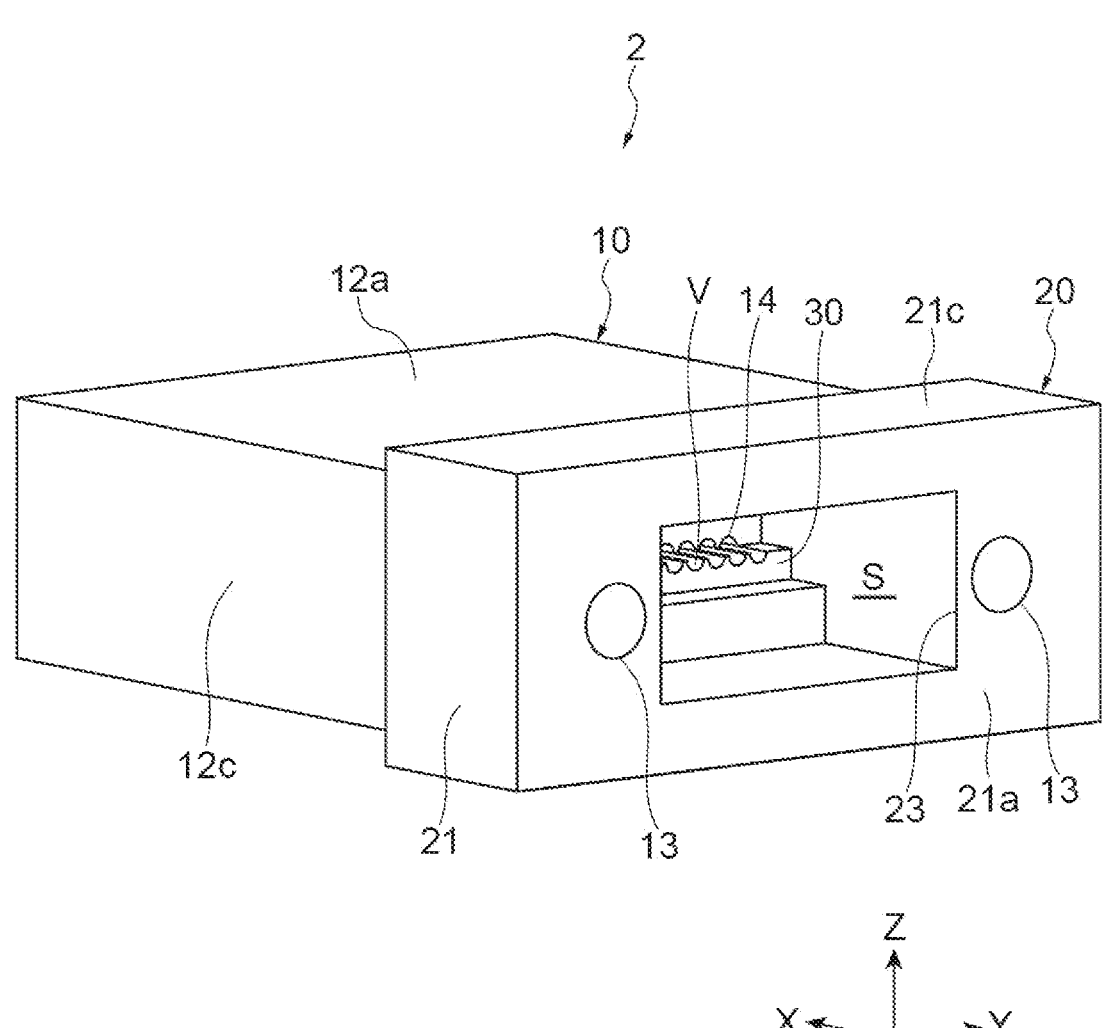
FIG. 4 is a perspective view of the optical connector ferrule.
Figure 5:
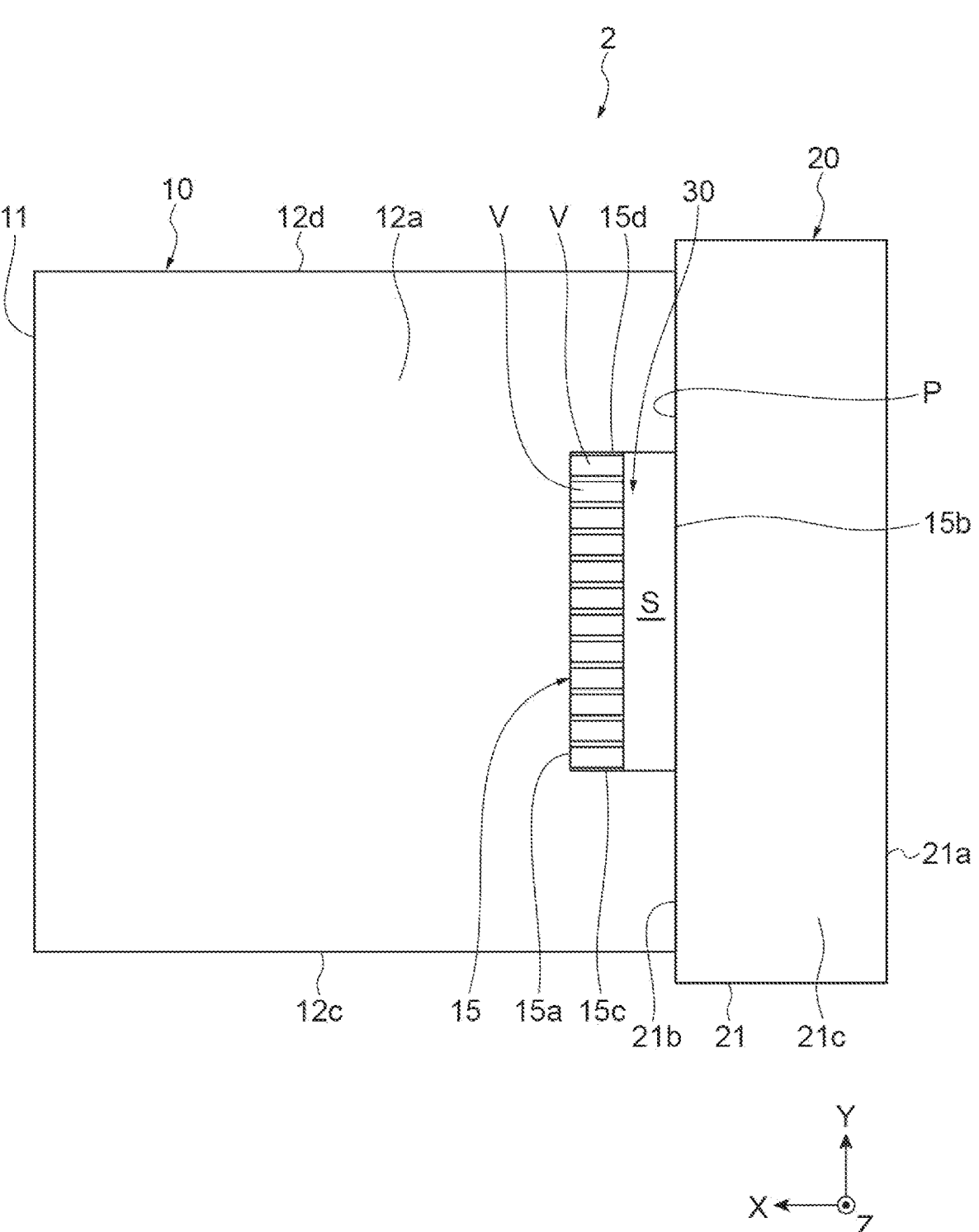
FIG. 5 is a plan view of the optical connector ferrule.
Figure 6:
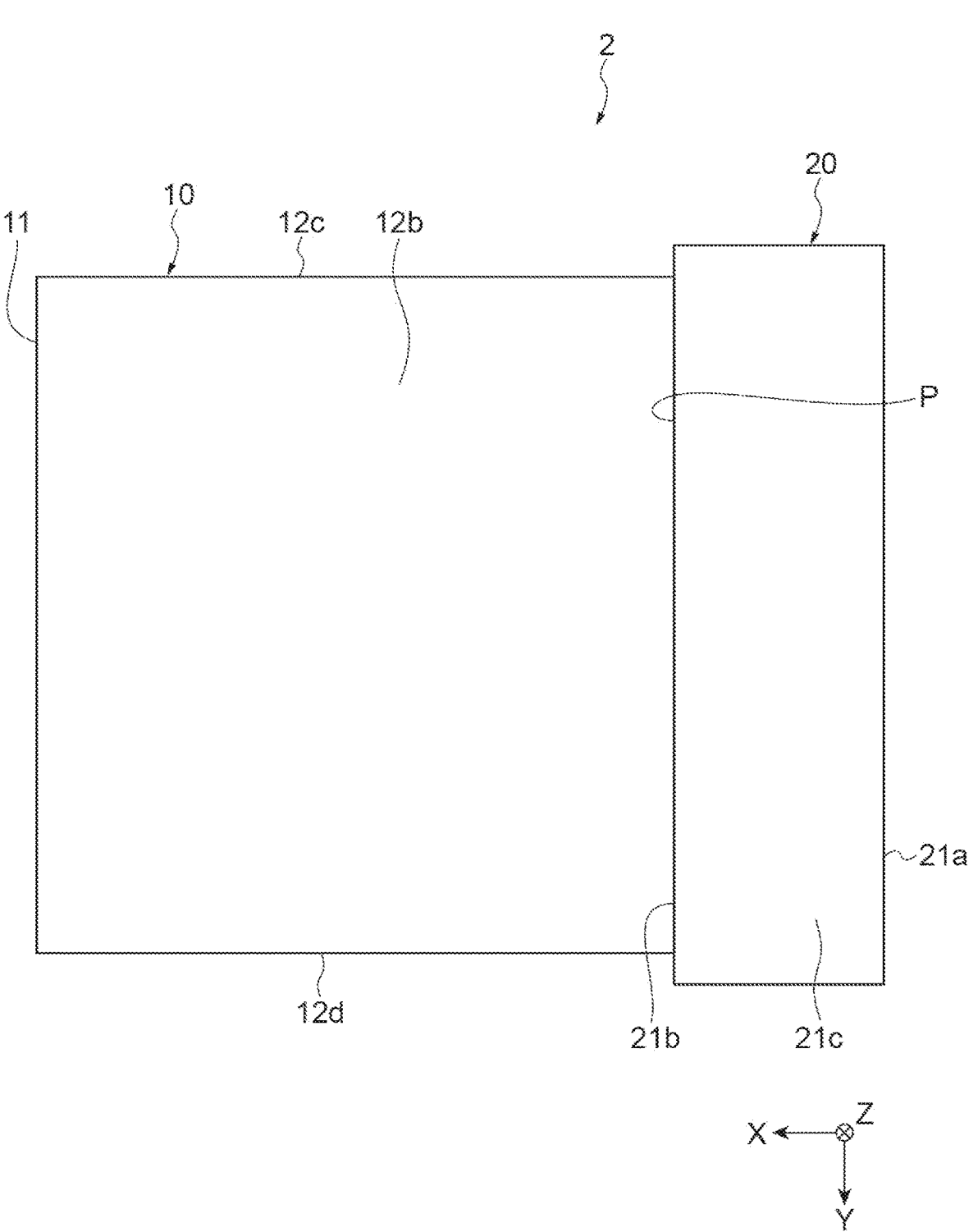
FIG. 6 is a bottom view of the optical connector ferrule.
Figure 7:
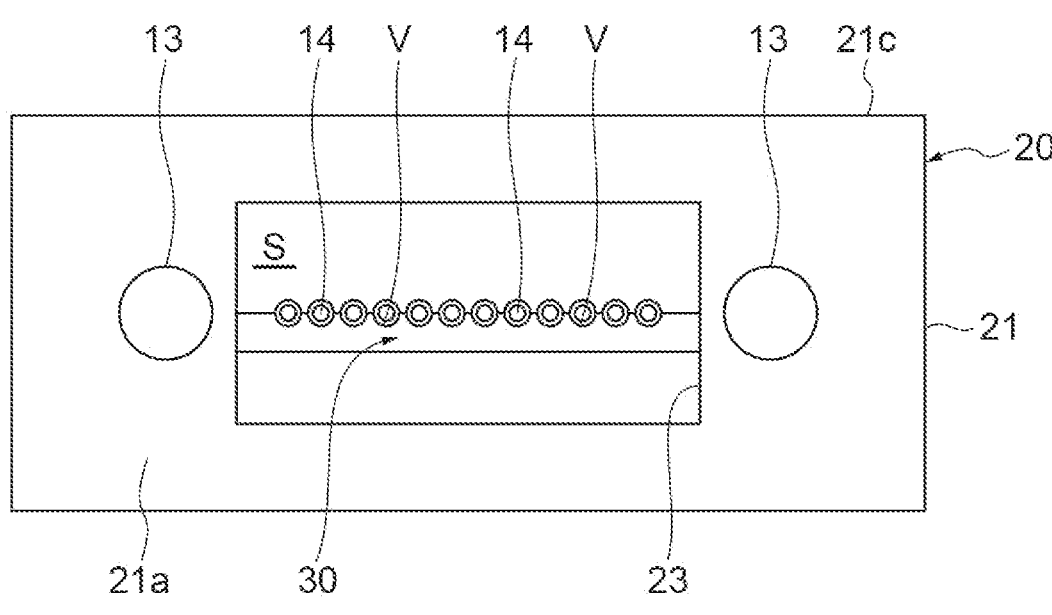
FIG. 7 is a side view illustrating a front end surface of the optical connector ferrule.

FIGS. 3 to 7 illustrate a configuration of the ferrule 2. FIGS. 3 and 4 are perspective views of the ferrule 2. FIG. 5 is a plan view of the optical connector ferrule. FIG. 6 is a bottom view of the optical connector ferrule. FIG. 7 is a side view of the optical connector ferrule.

The ferrule 2 can be manufactured by injection-molding a synthetic resin using a mold. Examples of the resin used for molding the ferrule 2 include polyphenylene sulfide (PPS), polyetherimide (PEI), polybutylene terephthalate (PBT), polycarbonate (PC), polymethyl methacrylate (PMMA), polyethersulfone (PES), polyamide (PA), and cycloolefin polymer (COP). The ferrule 2 may be made of another resin material. The ferrule 2 is manufactured by resin molding by a known method.

The internal space S is formed inside the ferrule 2. The filled resin portion 4 is disposed in the internal space S. The ferrule 2 includes a front end portion 10 and a rear end portion 20. The front end portion 10 includes a front end surface 11 and side surfaces 12a, 12b, 12c, and 12d. The front end surface 11 and the side surfaces 12a, 12b, 12c, and 12d are connected to each other. For example, the front end surface 11 and the side surfaces 12a, 12b, 12c, and 12d are orthogonally connected to each other.

The front end surface 11 is a surface located at a front end of the ferrule 2, and is a surface facing a front end surface of another optical connector when the optical connector 1 in which the optical fibers 7 are incorporated in the ferrule 2 is connected to another optical connector. The front end surface 11 is orthogonal to the X-axis direction. The side surfaces 12a, 12b, 12c, and 12d extend in a direction intersecting the front end surface 11. The side surfaces 12a, 12b, 12c, and 12d face a pair of the side surfaces 12a and 12b facing each other in the Z-axis direction each other in the Y-axis direction.

A pair of guide holes 13, a plurality of optical fiber holes 14, and a window 15 are formed in the front end portion 10. The plurality of optical fiber holes 14 and the window 15 communicate with the internal space S. The pair of guide holes 13 is separated from the internal space S.

A guide pin for fixing the ferrule 2 to another optical connector ferrule is inserted into each of the guide holes 13. The guide pin may be attached to the optical connector 1 or may be attached to another optical connector. The ferrules can be positioned using the guide pins by the guide holes 13, and the optical fibers held by the ferrules are optically connected to each other. The guide pin inserted into each of the guide holes 13 has, for example, a columnar outer shape. Each of the guide holes 13 is opened in the front end surface 11. Each of the guide holes 13 extends in an intersecting direction intersecting the front end surface 11. In the present embodiment, each of the guide holes 13 extends in the X-axis direction.

The optical fiber 7 is inserted into and fixed to each of the optical fiber holes 14. In other words, each of the optical fiber holes 14 individually accommodates the corresponding optical fiber 7 among the plurality of optical fibers 7. Each of the optical fiber holes 14 is opened in the front end surface 11. The optical fiber 7 inserted into each of the optical fiber holes 14 includes a tip exposed at the front end surface 11. As a result, each of the optical fibers 7 can be optically coupled to an optical fiber of another optical connector at the tip exposed at the front end surface 11. Each of the optical fiber holes 14 extends in the intersecting direction intersecting the front end surface 11. Each of the optical fiber holes 14 extends in the X-axis direction. The plurality of optical fiber holes 14 form openings disposed in one row and multiple columns on the front end surface 11. In the present embodiment, the plurality of optical fiber holes 14 are disposed in one column in the Y-axis direction. The plurality of optical fiber holes 14 are sandwiched between the pair of guide holes 13.

The window 15 is opened in the Z axis direction on the side surface 12a. In other words, the window 15 is formed on the side surface 12a of the front end portion 10. The number of windows 15 is not limited, and may be one or more. The window 15 communicates with the internal space S, and has a size capable of injecting the resin forming the resin portion 4 into the internal space S.

The front end portion 10 includes edges 15a, 15b, 15c, and 15d that define the window 15. In the present embodiment, when viewed in the Z-axis direction, the window 15 has a rectangular shape with the edges 15a, 15b, 15c, and 15d as four sides. The edge 15a and the edge 15b face each other in the X-axis direction. The edge 15c and the edge 15d face each other in the Y-axis direction. The edge 15a is closer to the front end surface 11 than the edge 15b.

In the optical connector 1, the internal space S is filled with a resin that forms the resin portion 4. The resin portion 4 is exposed from the window 15. The resin portion 4 exposed at the window 15 is formed to be flush with the side surface 12a.

As illustrated in FIGS. 2, 4, 5, and 7, the front end portion 10 further includes a step portion 30. The step portion 30 is formed in the internal space S. The step portion 30 is provided at a position overlapping the window 15 when viewed in the Z-axis direction. A plurality of grooves V are formed in the step portion 30. Each of the grooves V extends in the X-axis direction. At least a part of the plurality of grooves V is disposed at a position overlapping the window 15 when viewed in the Z-axis direction. In the present embodiment, at least a part of all the grooves V can be visually recognized from the window 15 in a state where the resin portion 4 is removed. The optical fiber 7 inserted into each of the optical fiber holes 14 is disposed in each of the grooves V. The plurality of optical fiber holes 14 are located on extension lines in the X-axis direction from the plurality of grooves V formed in the step portion 30. Each of the optical fiber holes 14 and each of the grooves V are disposed in a one-to-one relationship. In the present embodiment, each of the grooves V is connected to the corresponding optical fiber hole 14 among the plurality of optical fiber holes 14.

The rear end portion 20 is connected to the front end portion 10 on a side opposite to the front end surface 11 in the X axis direction. The rear end portion 20 includes a rear end surface 21a facing the front end surface 11 in the X axis direction. An opening 23 is formed on the rear end surface 21a of the rear end portion 20. The opening 23 is filled with a resin that forms the resin portion 4. As illustrated in FIG. 2, the resin portion 4 and the rubber portion 5 are exposed at the opening 23. The resin portion 4 exposed at the opening 23 is formed to be flush with the rear end surface 21a. The rubber portion 5 is disposed between the ferrule 2 and the resin portion 4. The optical fiber ribbon 3 can be inserted into the opening 23.

The rear end portion 20 includes a flange portion 21. The flange portion 21 is connected to the front end portion 10 on the opposite side of the front end surface 11. A flange surface 21b of the flange portion 21 and the side surface 12a of the front end portion 10 are connected at a connection position P. The flange portion 21 protrudes from the front end portion 10 in a direction along the front end surface 11. In the present embodiment, the flange portion 21 protrudes from the front end portion 10 in the Z-axis direction and the Y-axis direction when viewed in the X-axis direction.

The flange portion 21 includes a flange surface 21b facing the rear end surface 21a in the X-axis direction, and a top surface 21c. The flange surface 21b is connected to the side surfaces 12a, 12b, 12c, and 12d of the front end portion 10 at the connection position P. The flange surface 21b extends from the side surfaces 12a, 12b, 12c, and 12d in the Y-axis direction and the Z-axis direction. For example, the flange surface 21b and the side surfaces 12a, 12b, 12c, and 12d are orthogonal to each other. The top surface 21c is connected to the flange surface 21b. The top surface 21c extends in the X axis direction from the flange surface 21b. When viewed in the Z-axis direction, the top surface 21c does not overlap the side surface 12a. The top surface 21c is disposed at a position different from the side surface 12a in the Z-axis direction. The top surface 21c and the side surface 12a form a step. The step is formed by the top surface 21c, the flange surface 21b, and the side surface 12a.

For example, the shortest distance between the connection position P and a portion which is closest to the front end surface 11 in the edges 15a to 15d is less than or equal to $\frac{2}{5}$ of the shortest distance between the connection position P and the front end surface 11. The shortest distance between the connection position P and the portion which is closest to the front end surface 11 the edges 15a to 15d corresponds to the maximum distance between the edges 15a to 15d of the window 15 and the flange surface 21b in the X-axis direction. The edge 15*a* is closest to the front end surface 11 among the edges 15*a* to 15*d*. A portion which is closest to the front end surface 11 in the edges 15*a* to 15*d* is included in the edge 15*a*. In other words, the shortest distance between the front end surface 11 and the window 15 is equal to or more than ⅗ of the shortest distance between the connection position P and the front end surface 11.

For example, the shortest distance between the connection position P and the portion which is closest to the front end surface 11 in the edges 15*a* to 15*d* is less than or equal to a width of the flange portion 21 in the X-axis direction. The width of the flange portion 21 in the X axis direction corresponds to a width of the top surface 21*c* in the X axis direction. In other words, the window 15 is located in a region of the side surface 12*a* from the flange portion 21 by the length of the flange portion 21 in the X axis direction as viewed in the Z axis direction.

For example, the shortest distance between the connection position P and the window 15 is 0 mm or more and less than 1 mm. In the present embodiment, the window 15 is defined by the side surface 12*a* of the front end portion 10 and the flange surface 21*b* of the flange portion 21. In this case, the edge 15*d* defining the window 15 is included in the flange surface 21*b* of the flange portion 21. In this case, the shortest distance between the window 15 and the connection position P where the flange surface 21*b* of the flange portion 21 and the side surface 12*a* of the front end portion 10 are connected to each other is 0 mm. As a modification of the present embodiment, in a case where the shortest distance between the connection position P and the window 15 is larger than 0 mm, the window 15 and the flange portion 21 are separated from each other. In this case, a part of the side surface 12*a* is disposed between the connection position P and the edge 15*d* of the window 15.

Figure 8:
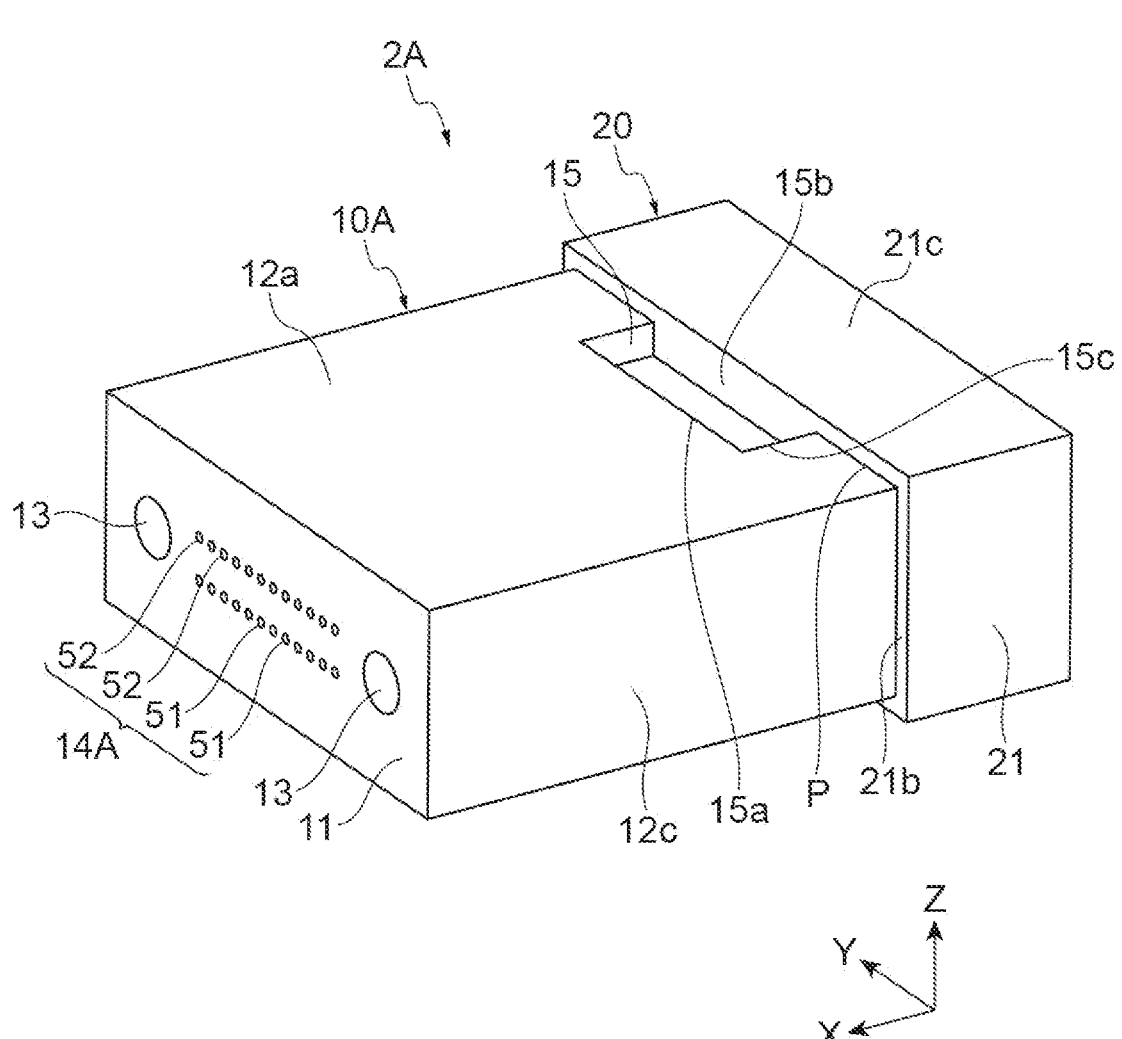
FIG. 8 is a perspective view of an optical connector ferrule according to a modification of the embodiment.
Figure 9:
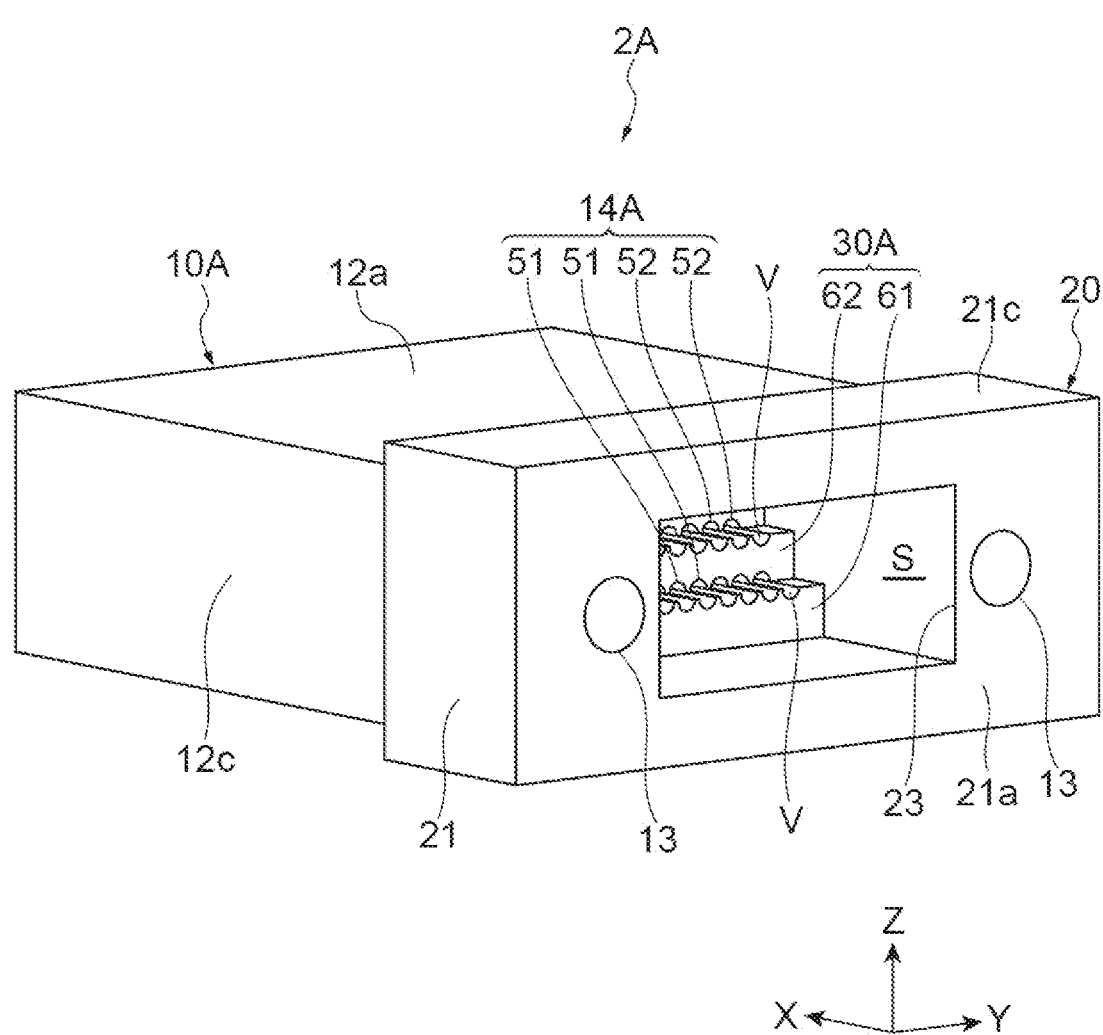
FIG. 9 is a perspective view of the optical connector ferrule according to the modification.
Figure 10:
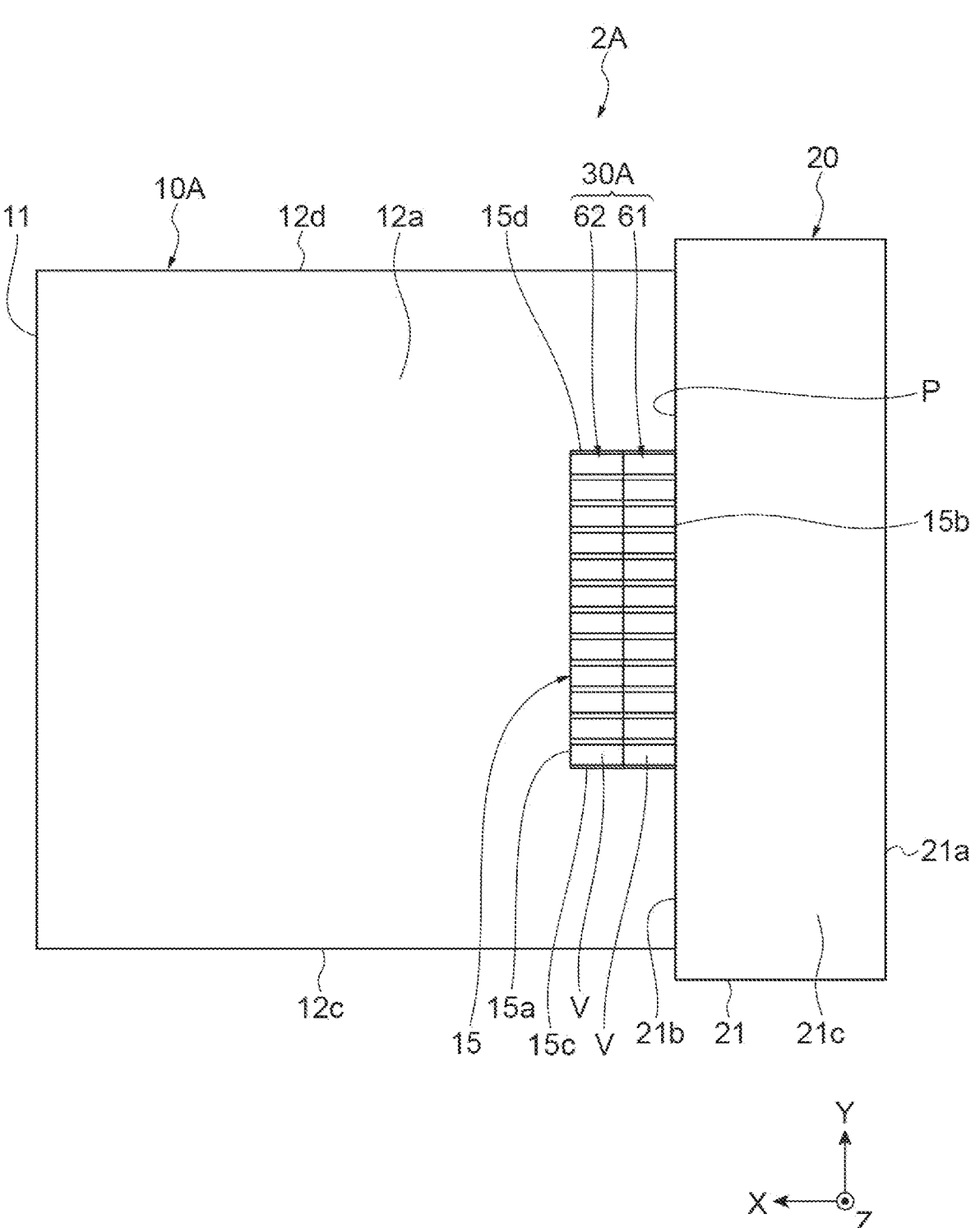
FIG. 10 is a plan view of the optical connector ferrule according to the modification.
Figure 11:
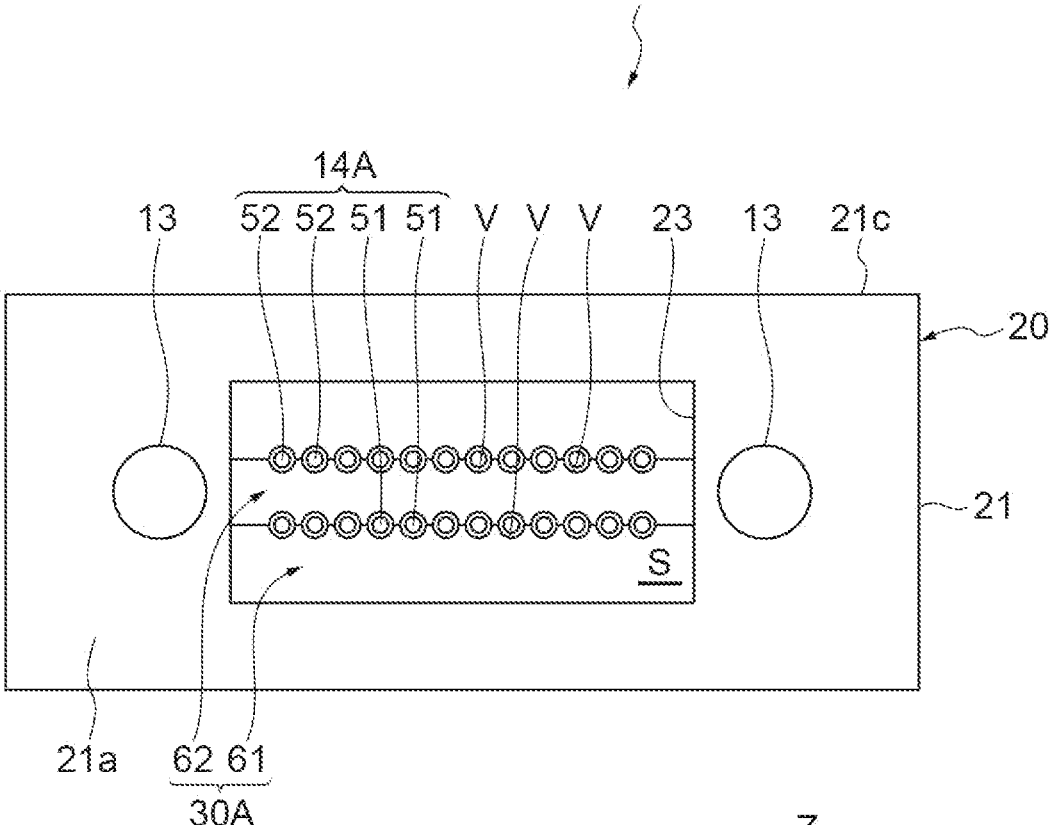
FIG. 11 is a side view illustrating a front end surface of the optical connector ferrule in the modification.

Next, an example of an overall configuration of an optical connector according to a modification of the present embodiment will be described with reference to FIGS. 8 and 11. FIG. 8 is a perspective view of an optical connector ferrule according to the modification of the embodiment. FIG. 9 is a perspective view of the optical connector ferrule according to the modification. FIG. 10 is a plan view of the optical connector ferrule according to the modification. FIG. 11 is a side view illustrating a front end surface of the optical connector ferrule according to the modification. The present modification is generally similar to or the same as the above-described embodiment. The present modification is different from the above-described embodiment in that a front end portion includes a plurality of step portions. Hereinafter, differences between the above-described embodiment and the modification will be mainly described.

In the present modification, an optical connector includes an optical connector ferrule 2A. Hereinafter, the optical connector ferrule 2A is simply referred to as a "ferrule 2A". The ferrule 2A corresponds to the ferrule 2. The ferrule 2A includes a front end portion 10A and a rear end portion 20. An internal space S is formed inside the ferrule 2A. The filled resin portion 4 is disposed in the internal space S.

The front end portion 10A includes a front end surface 11 and side surfaces 12*a*, 12*b*, 12*c*, and 12*d*. A pair of guide holes 13, a plurality of optical fiber holes 14A, and a window 15 are formed in the front end portion 10A. The plurality of optical fiber holes 14A communicate with the internal space S.

An optical fiber 7 is inserted into and fixed to each of the optical fiber holes 14A. Each of the optical fiber holes 14A individually accommodates each corresponding optical fiber 7 among a plurality of the optical fibers 7. Each of the optical fiber holes 14A is opened at the front end surface 11. The optical fiber 7 inserted into each of the optical fiber holes 14A includes a tip exposed at the front end surface 11. Each of the optical fiber holes 14A extends in the intersecting direction intersecting the front end surface 11. Each of optical fiber holes 14A extends in the X-axis direction. In the present modification, the plurality of optical fiber holes 14A is arranged in a matrix when viewed in the X-axis direction. The plurality of optical fiber holes 14A forms openings arranged in multiple rows and multiple columns on the front end surface 11. The plurality of optical fiber holes 14A forms a plurality of columns arranged in the Z-axis direction. In each column, the plurality of optical fiber holes 14A are disposed in the Y-axis direction. The plurality of optical fiber holes 14A are arranged in the Y-axis direction and the Z-axis direction.

The plurality of optical fiber holes 14A includes a plurality of optical fiber holes 51 and a plurality of optical fiber holes 52. The plurality of optical fiber holes 51 is disposed in one column in the Y-axis direction. The plurality of optical fiber holes 52 is disposed in one column in the Y-axis direction. The plurality of optical fiber holes 52 is closer to the side surface 12*a* than the plurality of optical fiber holes 51. The optical fiber holes 52 and the optical fiber holes 51 are arranged in the Z-axis direction. The plurality of optical fiber holes 51 and 52 are sandwiched between the pair of guide holes 13. For example, the number of the plurality of optical fiber holes 51 and the number of the plurality of optical fiber holes 52 are the same.

As illustrated in FIGS. 9 to 11, the front end portion 10A includes a plurality of step portions 30A. The plurality of step portions 30A is formed in the internal space S. The plurality of step portions 30A is arranged in steps in the X-axis direction. In the present modification, the plurality of step portions 30A includes two step portions 61 and 62. The step portion 62 is closer to the side surface 12*a* than the step portion 61.

The plurality of step portions 62 and 61 is disposed at positions overlapping the window 15 when viewed in the Z-axis direction. A plurality of grooves V is formed in each of the step portions 61 and 62. At least a part of the plurality of grooves V of each of the step portions 61 and 62 is disposed at a position overlapping the window 15 when viewed in the Z-axis direction. In the present modification, at least a part of the grooves V of all the step portions 30A can be visually recognized from the window 15 in a state where the resin portion 4 is removed.

The plurality of optical fiber holes 51 is located on extension lines in the X-axis direction from the plurality of grooves V formed in the step portion 61. Each of the optical fiber holes 51 and each of the grooves V formed in the step portion 61 are disposed in a one-to-one relationship. In the present modification, each of the grooves V formed in the step portion 61 is connected to the corresponding optical fiber hole 51 among the plurality of optical fiber holes 51. The plurality of optical fiber holes 52 is located on extension lines in the X-axis direction from the plurality of grooves V formed in the step portion 62. Each of the optical fiber holes 52 and each of the grooves V formed in the step portion 62 are disposed in a one-to-one relationship. In the present modification, each of the grooves V formed in the step portion 62 is connected to the corresponding optical fiber hole 52 among the plurality of optical fiber holes 52.

The optical connector 1 is produced by preparing the ferrule 2 or the ferrule 2A described above, inserting the optical fiber 7 into each of the optical fiber holes 14 and 14A, filling the optical fiber 7 with resin from the window 15, and fixing the optical fiber 7 to the ferrule 2 or the ferrule 2A by curing the resin filled from the window 15. The resin filled from the window 15 forms the resin portion 4.

Figure 12:
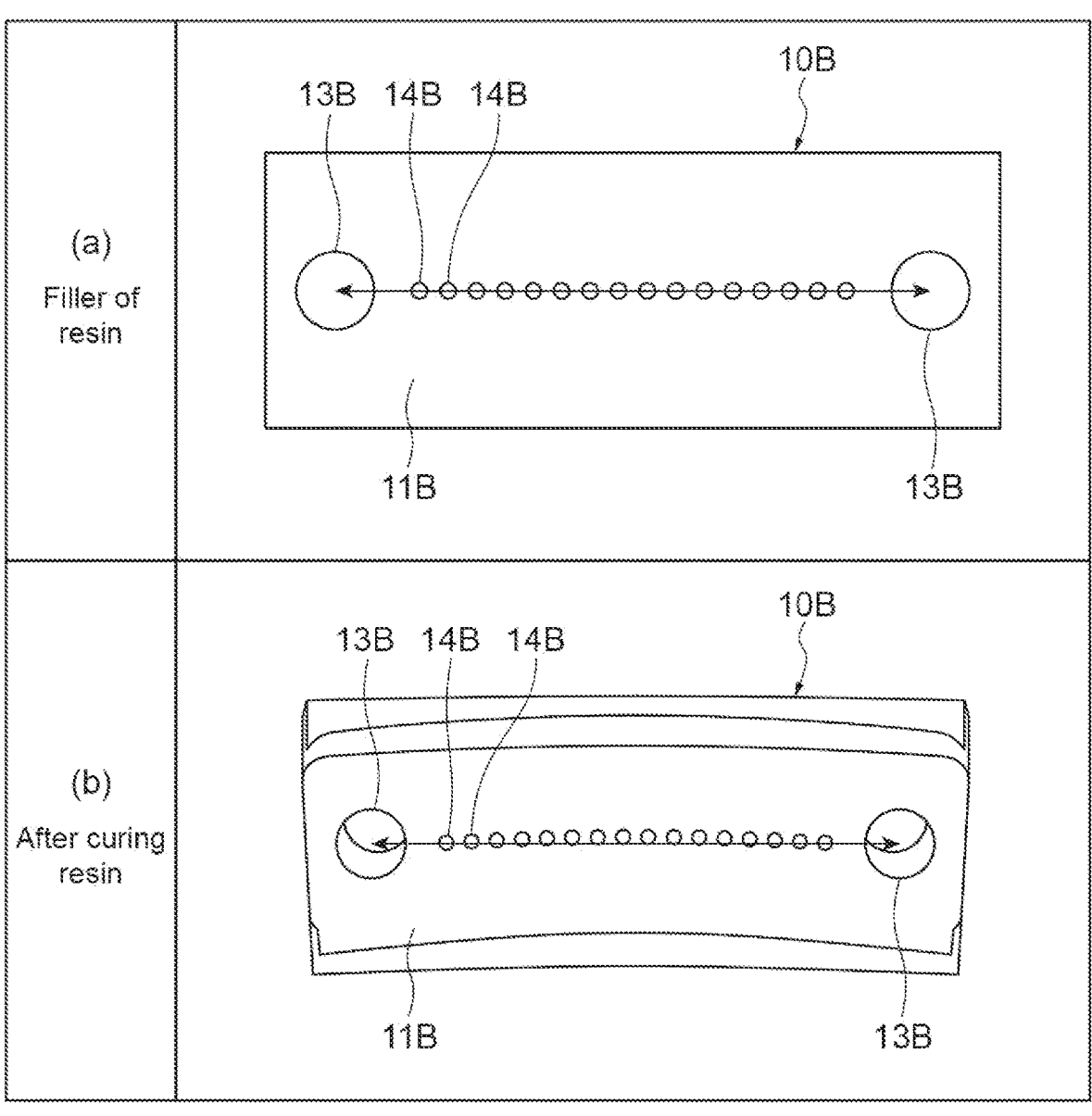
FIG. 12 is a diagram illustrating a front end surface of an optical connector ferrule before resin injection and a front end surface of an optical connector ferrule after resin curing as a comparative example.

Next, functions and effects of the ferrules 2 and 2A of the optical connector 1 will be described with reference to FIG. 12. FIG. 12 is a diagram illustrating a front end surface of the optical connector ferrule before resin injection and a front end surface of the optical connector ferrule after resin curing as a comparative example. Part (a) of FIG. 12 illustrates a front end surface 11B of the optical connector ferrule before resin injection. Part (b) of FIG. 12 illustrates the front end surface 11B of the optical connector ferrule after resin curing.

The optical connector ferrule in the comparative example includes a front end portion 10B instead of the front end portions 10 and 10A. In the front end portion 10B, a pair of guide holes 13B corresponding to the pair of guide holes 13 and a plurality of optical fiber holes 14B corresponding to the optical fiber holes 14 are formed in the front end surface 11B corresponding to the front end surface 11. In the optical connector ferrule in the comparative example, as compared with the configurations of the ferrules 2 and 2A, the front end surface 11B and a window corresponding to the window 15 are close, and the window corresponding to the window 15 and a flange portion are far (See, for example, FIG. 2 of Patent Literature 1.). In this case, before resin injection, the pair of guide holes 13B and the plurality of optical fiber holes 14B are aligned on a straight line indicated by an arrow. The arrow is indicated on a straight line passing through the centers of gravity of the pair of guide holes 13B. However, after the resin is cured, the front end portion 10B is deformed, and the front end surface 11B is distorted. As a result, the plurality of optical fiber holes 14B deviates from the straight line indicated by the arrow. In this case, reliability of optical bonding with an optical fiber of another optical connector ferrule is deteriorated.

In the ferrules 2 and 2A of the optical connector 1, the shortest distance between the connection position P where the flange portion 21 and the front end portion 10 are connected to each other and the portion closest to the front end surface 11 among the edges 15a to 15d is, for example, less than or equal to the width of the flange portion 21 in the intersecting direction intersecting the front end surface 11. In this configuration, the front end surface 11 and the window 15 are relatively spaced apart. According to such a configuration, even in a case where the internal space S is filled with the resin from the window 15, the influence of the shrinkage of the resin hardly occurs on the front end surface 11. Moreover, in the above configuration, the window 15 and the flange portion 21 are relatively close. Since the flange portion 21 protrudes from the front end portion in the direction along the front end surface 11, the flange portion has higher rigidity than the front end portion 10. Accordingly, as the window 15 is closer to the flange portion 21, heat and shrinkage of the resin at the time of curing the resin near the window 15 hardly affect deformation of the ferrule. Therefore, deformation of the ferrules 2 and 2A is suppressed.

In the ferrules 2 and 2A of the optical connector 1, the shortest distance between the window 15 and the connection position P where the flange portion 21 and the front end portion 10 are connected to each other is, for example, 0 mm or more and less than 1 mm. Also in this configuration, the front end surface 11 and the window 15 are relatively distant from each other, and the window 15 and the flange portion 21 are relatively close to each other. Therefore, deformation of the ferrules 2 and 2A is suppressed.

In the ferrules 2 and 2A of the optical connector 1, the shortest distance between the connection position P where the flange portion 21 and the front end portion 10 are connected to each other and the portion which is closest to the front end surface 11 in the edges 15a to 15d is, for example, less than or equal to ⅖ of the shortest distance between the connection position P and the front end surface 11. Also in this configuration, the front end surface 11 and the window 15 are relatively distant from each other, and the window 15 and the flange portion 21 are relatively close to each other. Therefore, deformation of the ferrules 2 and 2A is suppressed.

In the ferrules 2 and 2A of the optical connector 1, the guide hole 13 into which a guide pin for fixing the ferrules 2 and 2A to another optical connector ferrule is inserted is formed in the front end portion 10. The guide hole 13 opens at the front end surface 11 and extends in the intersecting direction intersecting the front end surface 11. In this case, if deformation of the ferrules 2 and 2A is suppressed in the front end surface 11, displacement between the guide hole 13 and the optical fiber holes 14 and 14A is also suppressed. As a result, reliability of optical coupling with another optical connector ferrule can be improved.

In the ferrules 2 and 2A of the optical connector 1, the window 15 is defined by the edges 15a, 15c, and 15d included in the front end portion 10 and the flange portion 21. In this case, the shortest distance between the window 15 and the flange portion 21 is 0 mm. Therefore, the window 15 is close to the flange portion 21, and deformation of the ferrules 2 and 2A is further suppressed.

In the ferrules 2 and 2A of the optical connector 1, the front end portion 10 includes the groove V in which the optical fiber 7 is disposed at a position overlapping the window 15 when viewed in the orthogonal direction orthogonal to the side surface 12a on which the window 15 is formed. The optical fiber 7 is inserted into each of the optical fiber holes 14 and 14A. In this case, the position of the optical fiber 7 can be confirmed in the filling of the resin. The confirmation of the position of the optical fiber 7 in the filling of the resin and the deformation of the ferrules 2 and 2A can be compatible.

In the ferrule 2A of the optical connector 1, the plurality of optical fiber holes 14A disposed in the orthogonal direction orthogonal to the side surface 12a are opened on the front end surface 11. The front end portion 10 includes the plurality of step portions 30A. The plurality of step portions 30A is disposed in steps at positions overlapping the window 15 when viewed in the orthogonal direction orthogonal to the side surface 12a. The groove V is formed in each of the plurality of step portions 30A. Each of the plurality of optical fiber holes 14A disposed in the orthogonal direction orthogonal to the side surface 12a is located on an extension line from the groove V formed in each of the step portions 30A different from each other. In this case, even in the ferrule 2A having a relatively large number of optical fiber holes 14A, the position of the optical fiber 7 can be confirmed in the filling of the resin. The confirmation of the position of the optical fiber 7 in the filling of the resin and the deformation of the ferrule 2A can be compatible.

Although the embodiments of the present disclosure have been described in detail above, the present invention is not limited to the above embodiments, and can be applied to various embodiments. For example, the plurality of step portions 30A includes the two step portions 61 and 62, but may include three or more step portions. Also in this case, at least a part of the plurality of grooves V in each step portion is disposed at a position overlapping the window 15 as viewed in the Z-axis direction. In this case, three or more optical fiber holes 14A are arranged in the Z-axis direction.

REFERENCE SIGNS LIST 1 optical connector
2, 2A ferrule (optical connector ferrule)
3 optical fiber ribbon
4 resin portion
5 rubber portion
7 optical fiber
10, 10A, 10B front end portion
11, 11B front end surface
12a, 12b, 12c, 12d side surface
13, 13B guide hole
14, 14A, 14B, 51, 52 optical fiber hole
15 window
15a, 15b, 15c, 15d edge
20 rear end portion
21 flange portion
21a rear end surface
21b flange surface
21c top surface
23 opening
30, 30A, 61, 62 step portion
P connection position
S internal space
V groove

The invention claimed is:

1. An optical connector ferrule comprising:
a front end portion including a front end surface and a side surface that is connected to the front end surface and extends in a direction intersecting the front end surface; and
a flange portion connected to the front end portion on an opposite side of the front end surface in the front end portion, and protrudes from the front end portion in a direction along the front end surface,
wherein the front end portion includes at least one optical fiber hole opened in the front end surface and extending in an intersecting direction intersecting the front end surface, a window opened in the side surface, and an internal space communicating with the at least one optical fiber hole and the window,
the front end portion includes an edge defining the window, and
a shortest distance between a connection position where the flange portion and the front end portion are connected to each other and a portion which is closest to the front end surface in the edge is less than or equal to a width of the flange portion in the intersecting direction.

2. The optical connector ferrule according to claim 1, wherein
a guide hole is formed in the front end portion, and a guide pin configured to fix the optical connector ferrule to another optical connector ferrule is to be inserted into the guide hole, and
the guide hole opens in the front end surface and extends in the intersecting direction intersecting the front end surface.

3. The optical connector ferrule according to claim 1, wherein the window is defined by the edge included in the front end portion and the flange portion.

4. The optical connector ferrule according to claim 1, wherein the front end portion includes a groove, and, in the groove, an optical fiber inserted into the optical fiber hole is disposed at a position overlapping the window when viewed in an orthogonal direction orthogonal to the side surface on which the window is formed.

5. The optical connector ferrule according to claim 4, wherein
a plurality of the optical fiber holes are opened in the front end surface, and are disposed in the orthogonal direction orthogonal to the side surface on which the window is formed,
the front end portion includes a plurality of step portions disposed in steps at positions overlapping the window when viewed in the orthogonal direction, and the groove is formed in each of the step portions, and
each of the plurality of optical fiber holes disposed in the orthogonal direction is located on an extension line from the groove formed in each of the step portions different from each other.

6. An optical connector comprising:
the optical connector ferrule according to claim 1;
an optical fiber inserted into the optical fiber hole; and
a resin portion exposed from the window and configured to fix the optical fiber to the optical connector ferrule.

7. A production method for an optical connector using the optical connector ferrule according to claim 1, the production method comprising:
inserting an optical fiber into the optical fiber hole;
filling a resin from the window; and
fixing the optical fiber to the optical connector ferrule by curing the resin filled from the window.

8. An optical connector ferrule comprising:
a front end portion including a front end surface and a side surface that is connected to the front end surface and extends in a direction intersecting the front end surface; and
a flange portion connected to the front end portion on an opposite side of the front end surface in the front end portion, and protrudes from the front end portion in a direction along the front end surface,
wherein the front end portion includes at least one optical fiber hole opened in the front end surface and extending in an intersecting direction intersecting the front end surface, a window opened in the side surface, and an internal space communicating with the at least one optical fiber hole and the window,
the front end portion includes an edge defining the window, and
a shortest distance between a connection position where the flange portion and the front end portion are connected to each other and a portion which is closest to the front end surface in the edge is less than or equal to ⅔ of a shortest distance between the connection position and the front end surface.

9. The optical connector ferrule according to claim 8, wherein
a guide hole is formed in the front end portion, and a guide pin configured to fix the optical connector ferrule to another optical connector ferrule is to be inserted into the guide hole, and
the guide hole opens in the front end surface and extends in the intersecting direction intersecting the front end surface.

10. The optical connector ferrule according to claim 8, wherein the window is defined by the edge included in the front end portion and the flange portion.

11. The optical connector ferrule according to claim 8, wherein the front end portion includes a groove, and, in the groove, an optical fiber inserted into the optical fiber hole is disposed at a position overlapping the window when viewed in an orthogonal direction orthogonal to the side surface on which the window is formed.

12. The optical connector ferrule according to claim 11, wherein a plurality of the optical fiber holes are opened in the front end surface, and are disposed in the orthogonal direction orthogonal to the side surface on which the window is formed, the front end portion includes a plurality of step portions disposed in steps at positions overlapping the window when viewed in the orthogonal direction, and the groove is formed in each of the step portions, and each of the plurality of optical fiber holes disposed in the orthogonal direction is located on an extension line from the groove formed in each of the step portions different from each other.

13. An optical connector comprising:

the optical connector ferrule according to claim 8;

an optical fiber inserted into the optical fiber hole; and a resin portion exposed from the window and configured to fix the optical fiber to the optical connector ferrule.

14. A production method for an optical connector using the optical connector ferrule according to claim 8, the production method comprising:

inserting an optical fiber into the optical fiber hole;

filling a resin from the window; and fixing the optical fiber to the optical connector ferrule by curing the resin filled from the window.

* * * * *